United States Patent
Singhal et al.

(10) Patent No.: US 11,940,884 B2
(45) Date of Patent: Mar. 26, 2024

(54) CONTAINERIZED DATA MOVER FOR DATA PROTECTION WORKLOADS

(71) Applicant: Dell Products L.P., Round Rock, TX (US)

(72) Inventors: Upanshu Singhal, Bangalore (IN); Chandra Prakash, Bangalore (IN); Adam Brenner, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 17/679,548

(22) Filed: Feb. 24, 2022

(65) Prior Publication Data
US 2023/0267052 A1 Aug. 24, 2023

(51) Int. Cl.
*G06F 11/14* (2006.01)
*G06F 11/30* (2006.01)
*G06F 11/32* (2006.01)

(52) U.S. Cl.
CPC ...... *G06F 11/1464* (2013.01); *G06F 11/1451* (2013.01); *G06F 11/1469* (2013.01); *G06F 11/3034* (2013.01); *G06F 11/324* (2013.01)

(58) Field of Classification Search
CPC .. G06F 11/14; G06F 11/1464; G06F 11/1451; G06F 11/3034
See application file for complete search history.

(56) References Cited

U.S. PATENT DOCUMENTS

| | | | | |
|---|---|---|---|---|
| 8,078,652 B2* | 12/2011 | Basu | .................. | G06F 16/2462 707/963 |
| 8,078,653 B1* | 12/2011 | Bisson | .................. | G06F 16/164 707/829 |
| 11,119,867 B1* | 9/2021 | Chopra | ............... | G06F 11/1469 |
| 2011/0145217 A1* | 6/2011 | Maunder | ............... | G06F 16/148 707/E17.108 |
| 2017/0373940 A1* | 12/2017 | Shahab | .................. | G06F 9/5083 |
| 2019/0102717 A1* | 4/2019 | Wu | ........................ | H04L 41/147 |
| 2019/0109713 A1* | 4/2019 | Clark | ..................... | G06F 16/182 |
| 2019/0279281 A1* | 9/2019 | Kumar | ..................... | G06Q 30/0631 |
| 2020/0233817 A1* | 7/2020 | Dall | ........................ | G06F 9/546 |
| 2020/0250049 A1* | 8/2020 | Lee | ..................... | G06F 11/1469 |
| 2020/0394455 A1* | 12/2020 | Lee | ......................... | G06Q 40/08 |
| 2021/0073449 A1* | 3/2021 | Segev | ..................... | G06F 30/27 |
| 2021/0149769 A1* | 5/2021 | Balcha | ................ | G06F 11/1469 |
| 2021/0208974 A1* | 7/2021 | Balcha | ................ | G06F 9/45558 |

(Continued)

*Primary Examiner* — Kamini B Patel
(74) *Attorney, Agent, or Firm* — Staniford Tomita LLP

(57) ABSTRACT

A portable, self-contained data mover container with all required packages for data management, and which can be hosted on a physical host, VM, cloud or appliance, such as a storage array. The data mover container protects multiple workloads such as NAS, native OS filesystem, applications, and so on. An automated process spins up and tears down containers without any impact on the host. If a container fails to run on a host if desired resources are not available, it automatically runs on other hosts for same data set. Minimal user intervention to achieve scale and performance is required, as the system automatically computes the desired number of containers required depending upon dataset and available resources. Containers can be patched and upgraded independently on a host without making any change to the hosting environment.

19 Claims, 6 Drawing Sheets

(56) References Cited

U.S. PATENT DOCUMENTS

| | | | |
|---|---|---|---|
| 2021/0209099 A1* | 7/2021 | Marsden | G06F 16/2465 |
| 2021/0286765 A1* | 9/2021 | Takata | G06F 16/1865 |
| 2021/0334082 A1* | 10/2021 | Su | G06F 8/65 |
| 2021/0342725 A1* | 11/2021 | Marsden | G06F 16/908 |
| 2022/0092024 A1* | 3/2022 | Kavaipatti Anantharamakrishnan | G06F 16/125 |
| 2022/0121525 A1* | 4/2022 | Brenner | G06F 16/185 |
| 2022/0121528 A1* | 4/2022 | Brenner | G06F 3/0656 |
| 2022/0206902 A1* | 6/2022 | Hoang | G06F 9/541 |
| 2022/0334925 A1* | 10/2022 | Rakesh | G06F 11/1451 |

* cited by examiner

```
DATA MOVER CONTAINER
        302

NAS Agent
       304

Filesystem Slicer and Crawler
           306

Backup Agents
        308

Other Utilities
        310
```

CONTAINERIZED DATA MOVER FOR DATA PROTECTION WORKLOADS

TECHNICAL FIELD

Embodiments are generally directed to data backup systems, and more specifically to data block slicing for network attached storage (NAS) devices.

BACKGROUND

Data protection comprising backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage.

Protection of data workloads (e.g., applications, NAS shares, virtual machines, etc.) is traditionally done using dedicated physical or virtual hosts in a user environment (e.g., data center). Data protection agents are installed and maintained on application servers, Virtual Machines (VMs), data mover nodes for NAS, and so on. These hosts require high compute, memory and storage resources, and there is often a high impact on input/output (I/O) activities during data protection operations. Users may have separate nodes for data mover activity only, but they need to be maintained separately. In order to achieve scale and performance, users are required to install and maintain multiple nodes and usually cannot determine how many nodes are required to run the backup and recovery operations with each schedule. In some cases, a user needs to install and maintain other tools e.g. Python, Java, host utilities, and so on, for data protection agents to work, and are required to install latest updates to continue supporting agents. In a traditional data protection environment, it is difficult to run multiple instances of the agents concurrently, maintain multi-tenancy capability, and keep backup and recovery jobs running concurrently on the same host.

Present systems use dedicated compute nodes during data protection solution configuration. For example, a single NAS share is traditionally backed up on a single compute node and can run limited number of parallel threads as prescribed by underlying backup protocol such as NDMP. Such existing methods are dependent on user inputs and configuration, and backup execution is confined to this pre-configured infrastructure. Users often deploy fat compute nodes to achieve scale and performance and most of the time these nodes sit idle when no backup or recover workloads are running. Existing backup technologies are designed in such a way that they do not consider impact on a NAS array during backup and do not provide any method to throttle down or throttle up the backup workload. In present systems, orchestration of compute nodes is highly dependent on applications as well, which is called a Federated backup for an application. Application hosts distribute the backup among the nodes participating in the application cluster. This helps in running backups in parallel on multiple nodes, but the scope is limited to a particular application only and the number of nodes available in an application cluster.

What is needed, therefore, is a backup system that improves on present systems that rely on pre-configured or pre-defined nodes to intelligently initiate and configure backup nodes to protect multiple workloads in a manner that provided resiliency and minimal user intervention.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, PowerProtect Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
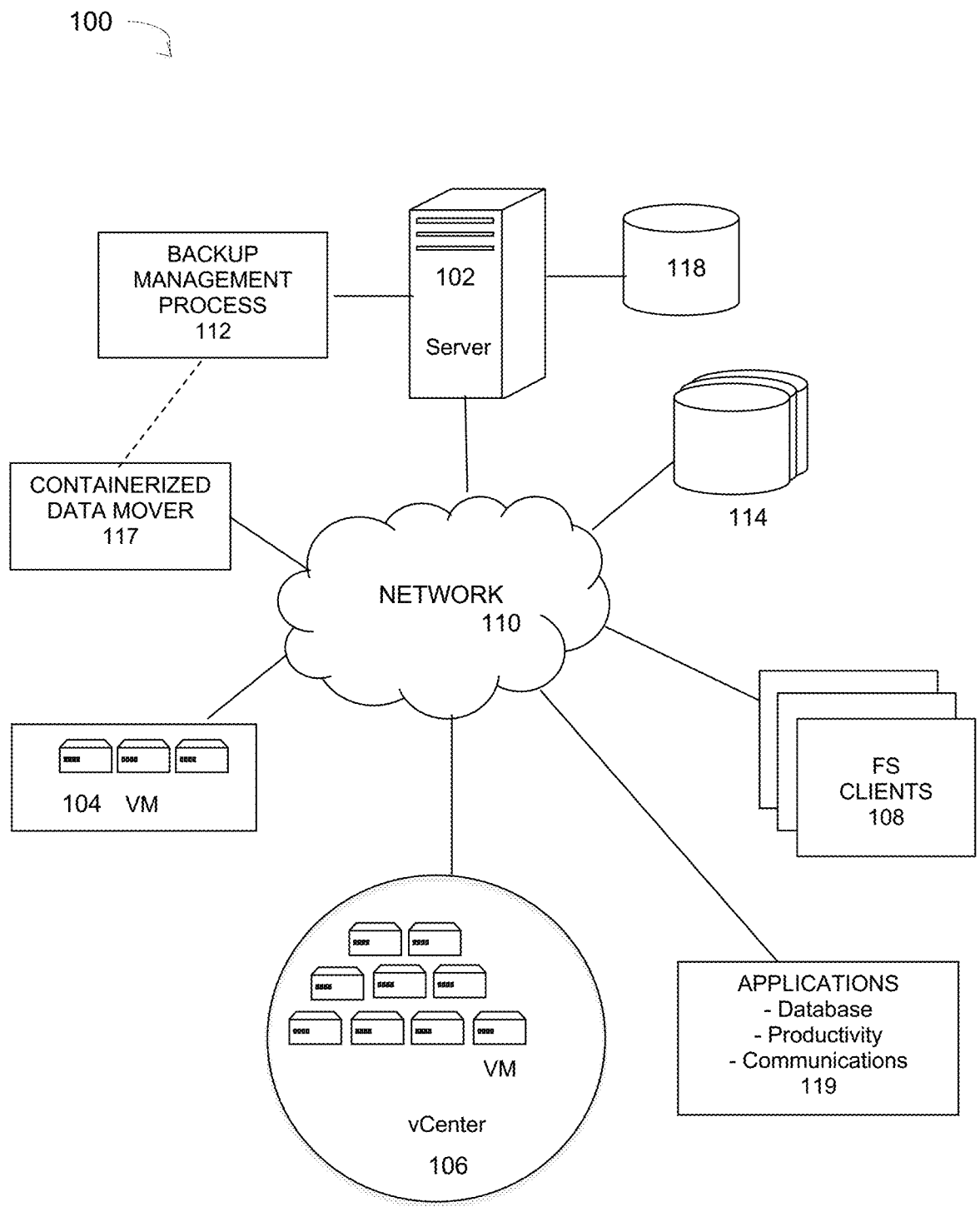
FIG. 1 is a diagram of a large-scale data backup system implementing a containerized data mover process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

The network may be a data storage network comprising large numbers of storage devices, such as disk drives, tape drives, solid state devices (SSD or flash), and the like. These storage devices may be organized in one or more arrays, and implement data storage protocols, such a network attached storage (NAS), and so on. FIG. 1 illustrates a computer network system 100 that implements one or more embodiments of an intelligent file system slicer method and system for NAS devices. System 100 represents a network backup system that can backup data from one or more data sources to one or more different storage media domains, such as a physical disk storage domains and virtual hard disk (VHD) domains. The data storage devices can also be provided as part of any other standalone or array-based storage, such as a storage area network (SAN) or networked storage array.

Embodiments provide a containerized data mover for different data management and data protection workloads. A Docker container technology is applied to backup and recover multiple workloads, such as NAS, filesystem, database applications, and so on, from a single, pre-packaged container. This container can be hosted on a Virtual Machine, physical host, data protection appliance, data storage appliance, or cloud to protect the data. Embodiments provide a container to address scale and performance, management of containers such as when to spin off and when to tear down, multi-tenancy aspect and also maintenance of container for patches and upgrades.

In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114.

The data sourced by the data source may be any appropriate type of data, such as database data that is part of a database management system. In this case, the data may reside on one or more storage devices of the system, and may be stored in the database in a variety of formats. One example is an Extensible Markup Language (XML) database, which is a data persistence software system that allows data to be stored in XML format.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

Besides VM storage, the data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. Other types of storage architectures may also be used, such as storage area network (SAN), network-attached storage (NAS), or direct-attached storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices.

For the embodiment of FIG. 1, network system 100 includes a server 102 that executes a backup management process 112 automates the backup of network data using the target VM devices or the dynamic disks 114. In an embodiment, the process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC PowerProtect Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack.

As stated above, embodiments are used in NAS networks to provide data protection using snapshot backups. In general, NAS is a file-level storage architecture that provides a single access point for storage with built-in security, management, and fault-tolerance. In an NAS system, the storage software is usually deployed in a lightweight operating system that is embedded in the hardware. Data is transferred using TCP/IP protocols and can be formatted using a Network File Systems (NFS) protocol (commonly used by Linux, UNIX) and a Common Internet File System (CIFS) protocol (commonly used by Microsoft). Such a file system stores data in layers of directories and folders spanning many computers and machines in a network.

Embodiments use the Docker container technology and applies the technology to backup and recover multiple workloads e.g. NAS, Filesystem, Database Applications etc. from a single, pre-packaged container. This container can be hosted on a virtual machine, physical host, Data Protection Appliance, Data Storage Appliance and Cloud to protect the data. This invention provide details about the applicability of the Data Mover Container along with an example of NAS data protection, usage of the container to address scale and performance, management of containers such as when to spin off and when to tear down, multi-tenancy aspect and also maintenance of container for patches and upgrades.

The well-established Docker program deploys containers as portable, self-sufficient structures that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available. The Kubernetes system is a popular container management platform for managing containerized applications in a clustered environment and helps manage related, distributed components across varied infrastructures. Database applications on Kubernetes clusters come in a wide range of configurations and ranges, from standalone deployment to single partition cluster to multiple partition clusters.

In an embodiment, the containerized data mover process 117 uses a data mover container that is packaged with required agents such as NAS Agent, file system slicer, filesystem crawler and backup agent, as well as software packages such as Python, NFS and CIFS utilities. The data mover container can be orchestrated via REST APIs or container command line interfaces for backup, recovery, backup management, monitoring and troubleshooting. Multiple data mover containers can be run on single host and isolated from each other to facilitate running backup and recovery jobs separately, providing multi-tenancy for different data sets or clients, and isolated activities such as troubleshooting for specific data sets, and so on.

A REST (Representational State Transfer) API (application programming interface) conforms to a set of guidelines for creating stateless reliable web APIs, based on HTTP methods to access resources via URL-encoded parameters and the use of JSON (JavaScript Object Notation) or XML to transmit data. Embodiments are described with respect to the use of REST APIs, but other similar application program interfaces may be used.

The data mover container image can be hosted in an on-premises environment, in the cloud, or inside an appliance. The data mover container can be spun up and torn down based on the amount of workload, usage of compute resources (e.g., CPU and memory) to dynamically control the number of containers running on a host based on the available memory, CPU usage, storage and so on.

In an embodiment, the data mover container is instantiated from an orchestrator component using published APIs. While in normal operation, the data mover container performs its tasks and provides regular status updates to the orchestrator for task monitoring and job management. Once container finishes a task, it collects all the logs and any relevant information required for job completion and then tears down.

In a PowerProtect Data Management (PPDM), or similar system, an NAS solution implements the data mover container to protect NAS shares, and can run on single or multiple hosts concurrently to achieve desired performance, and can also scale from small to very large NAS workloads. The container is not limited to NAS workloads and can also be extended to protect native OS filesystem and database applications. In general, the PPDM dynamic solution requires this container to be hosted on a VM, but have lift and shift method to host in a cloud environment or storage arrays. Applications are not just limited to performing backup and recovery operations, but can also be utilized for data replication on remote arrays, object storage, and so on. The PPDM dynamic NAS solution manage these containers dynamically based on the workload, e.g., running multiple containers concurrently for both backup and recovery, managing the number of containers on a host based on available compute resources with the higher the resource, the higher the number of containers and conversely for hosts with lower resources.

The data mover container provides a degree of maintenance and resiliency. In order to upgrade or patch agents, this solution provides methods to update the container without bringing down any service or shutting down the host machine. If for some reason a container fails to start, another container can be instantiated on same or another host to continue the backup or recovery operation dynamically, without restarting the backup or recovery operation.

For purposes of description, certain workflows, user interfaces, and other details are described with reference to PPDM dynamic NAS Solution. It should be noted, however, that embodiments are not so limited and any similar data protection or data management platform may be used.

Figures 2, 3:
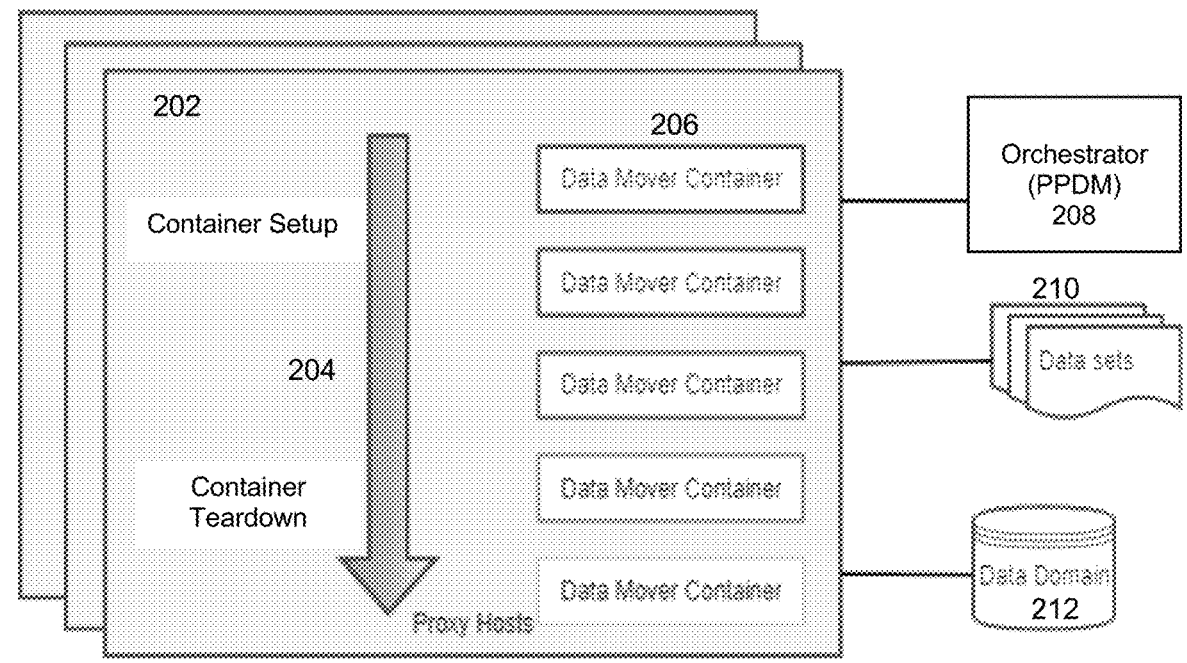
FIG. 2 illustrates the instantiation of data mover containers in a data management system, such as PPDM, under some embodiments.
FIG. 3 illustrates certain constituent components of a data mover container, under some embodiments.

FIG. 2 illustrates the instantiation of data mover containers in a data management system, such as PPDM, under some embodiments. As shown in diagram 200 of FIG. 2, a number of data mover containers are created in environment 202, which can be an on-premises environment, cloud, appliance, or other appropriate location. The containers are spun up and torn down according to a lifespan 204 starting with container setup to container teardown. The data mover containers are thus dynamic and not persistent data elements. Any number of data mover containers 206 may be created and maintained depending on system requirements and constraints.

In system 200, an orchestrator component, such as PPDM server 208 orchestrates the data mover containers during backup and recovery workloads, like NAS shares. Orchestration of data, over containers are centrally driven from PPDM server, or similar server. Data mover containers 206 are spun up and torn down automatically during backup and recovery operations to and from storage, such as PowerProtect Data Domain system 212. The number of containers are created depending on the size of the data asset 210 and also number of assets being protected. A user can control the I/O impact on the data source by defining number of parallel streams used during backup and recovery operations and these streams translate to number of data mover containers instantiated for each asset.

In an embodiment, a data mover container is a pre-packaged container that facilitates the movement of datasets 210 from primary to secondary storage or vice-versa during the backup and recovery operations. In general, data movers are components that are responsible for processing the data to be backed up and transferring the data from primary storage to a secondary or backup storage system. In an embodiment, a data protection or backup application product includes different types of data movers that operate at different levels of a storage or technology stack. For example, a data mover may run inside the guest operating system (OS) of a virtual machine having the application to be backed up, or it may run as another separate virtual machine and outside the virtual machine having the application to be backed up, or inside the hypervisor of the host hosting the virtual machine having the application to be backed up. The data mover container may be configured to operate with any appropriate type of data mover function or component.

As stated above, the data mover container is packaged with certain required agents that are orchestrated by APIs (e.g., REST APIs) or command line interfaces (CLIs). FIG. 3 illustrates certain constituent components of a data mover container, under some embodiments. As shown in FIG. 3, example data mover container 302 comprises an NAS agent 304, a file system slicer and crawler 306, one or more backup agents 308, as well as other utilities 310. The data mover container can be orchestrated via REST APIs or container command line interfaces. The components of data mover container 302 are provided for purposes of example only, and other or alternate components may be provided depending on the system configuration and applications.

Figure 4:
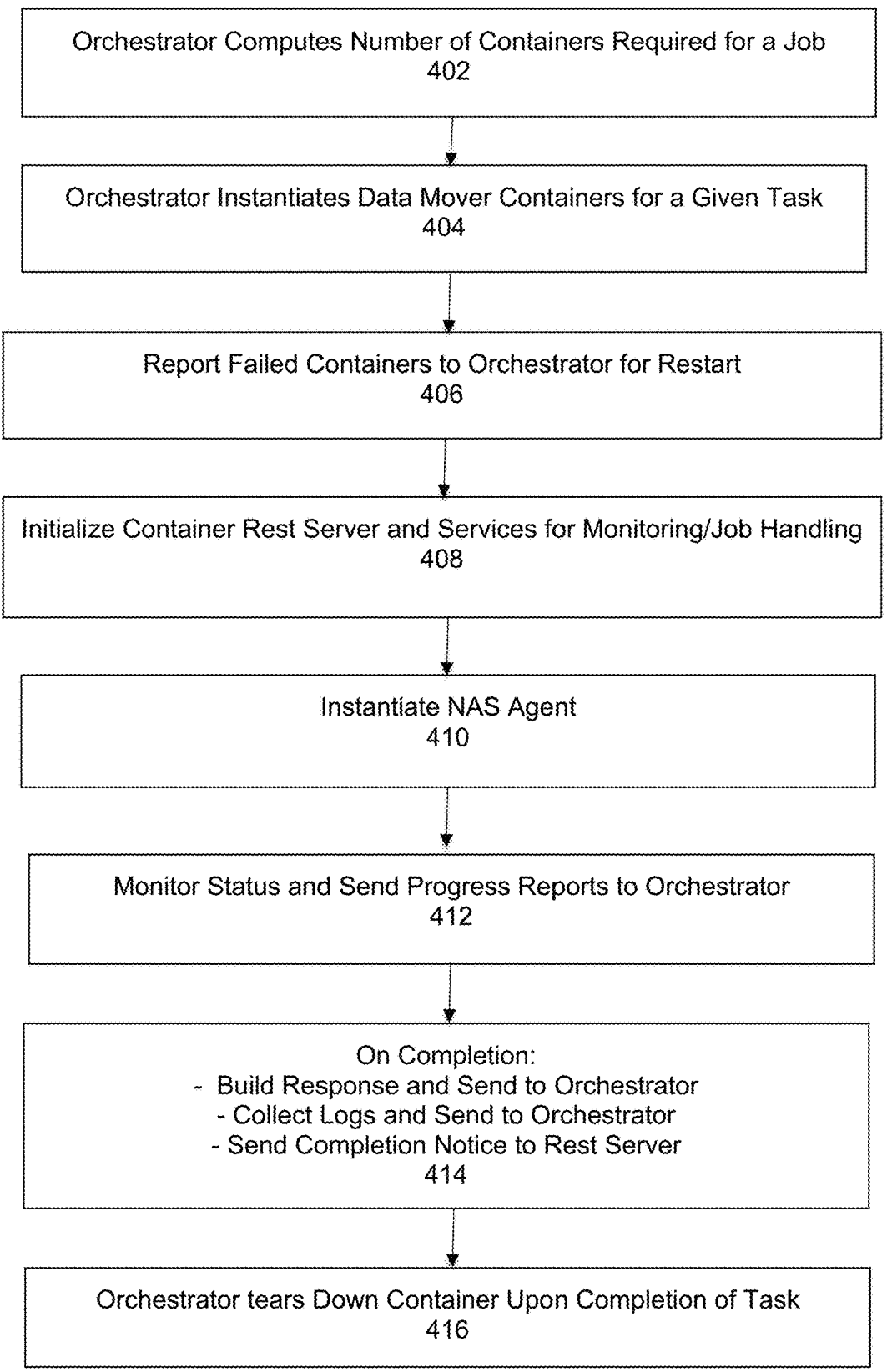
FIG. 4 is a flowchart that illustrates an overall method of instantiating and using data mover containers, under some embodiments.

FIG. 4 is a flowchart that illustrates an overall method of instantiating and using data mover containers, under some embodiments. The process of FIG. 4 starts with the orchestrator computing the number of containers required to run for the given job, 402. The number of containers is calculated based on amount of data, availability of available hosts to run containers, their compute size, the system bandwidth, and other relevant parameters. The orchestrator instantiates the data mover containers for a given task, 404. Containers are instantiated on hosts to run the job. If a container fails to start, it is reported to the orchestrator, and the orchestrator restarts that container on another available host or move that in queue to run later, 406.

In step 408, a container REST server is initialized along with any services for monitoring and job handling. The process then instantiates an NAS agent, 410. The NAS agent parses the options for task execution, such as create slices, perform backup or recovery, cleanup, snapshot and backup, and get data set statistics, and any other tasks. Based on the given operation, the NAS agent instantiates a data mover agent for backup and recovery The process continues monitoring the status of NAS agent and sends the progress reports to the orchestrator.

Upon completion of the task for the backup or recovery operation, 414, the process builds the response and sends it to the orchestrator. It also collects the logs and sends them to the orchestrator, and sends a completion notice to the REST server. The orchestrator then tears down the container on completion of the task, 416. For purposes of description, the term 'job' refers to a complete backup or recover operation for a single NAS share or Asset. A job consists of multiple tasks and each task is related to a container function. For example, backup of a Share1 is a job, and Share1 backup is divided into multiple tasks with respect to the amount of data it processes.

Figure 5:
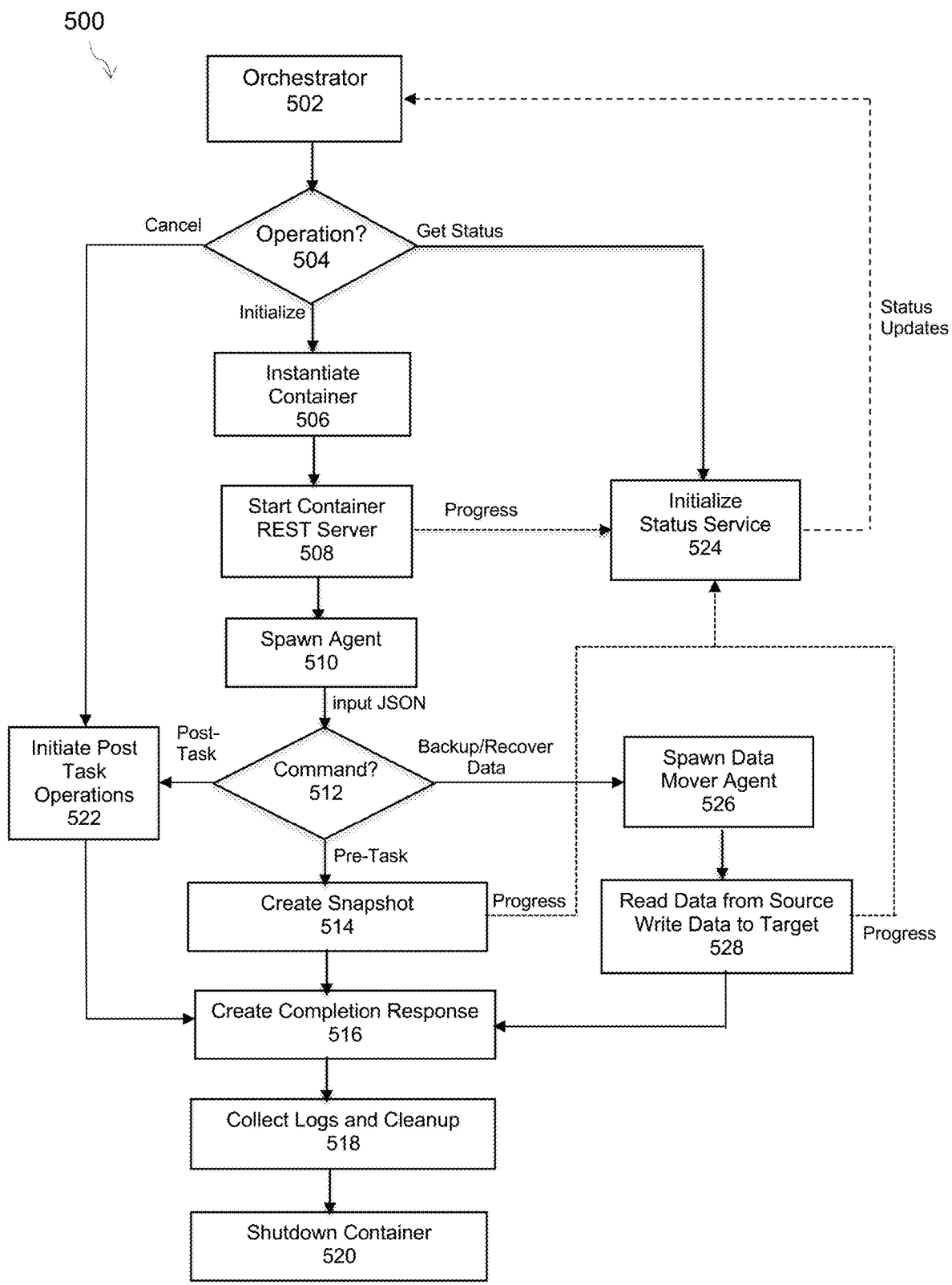
FIG. 5 is a flow diagram illustrating operation of an orchestrator and data mover container, under some embodiments.

FIG. 5 is a flow diagram illustrating operation of an orchestrator and data mover container, under some embodiments. As shown in diagram 500, an orchestrator 502 processes an operation 504 to either initialize, cancel, or get status of the operation. If initializing an operation, the orchestrator 502 instantiates a data mover container 506, and starts the container REST server 508. This initializes a status service 524, which is also used if the orchestrator 502 requests a status of the operation. The status service 524 sends periodic and on-demand status updates to the orchestrator 502.

After the container REST server is started 508, the process spawns an agent 510 to process a command 512. The agent may be a backup agent, recovery agent, or any appropriate executable agent. In an embodiment, the function of an agent is to communicate with the NAS or SAN system or database application, create a snapshot, create slices, and read data from the source and write data to the target device. Other agents may perform other tasks.

The command can comprise a pre-task, post-task, or backup/recover operation. For a pre-task operation, the process creates a snapshot 514, which, upon completion, creates a completion response, 516. The process then collects logs and performs a cleanup, 518, and the container is then torn down or shut down, 520.

If the command 512 is a backup/recover operation, the process spawns a data mover agent, 526 and reads the data from the source for writing to the target 528. Progress details are sent to the status service 524, and upon completion of the backup/recovery operation, the completion response is created, 516.

If the command 512 is a post-task operation, the process initiates post task operations 522 and upon completion of these operations, creates the completion response 516.

FIG. 3 illustrates some general components of a data mover container, under some embodiments. In an embodiment, a PPDM dynamic NAS system will run NAS workloads using Docker based containers called "NAS Container" on a proxy host. This container can be bundled with a proxy host OVA image and the image will be deployed along with the proxy host. The data mover container interfaces for overall system components are REST APIs served by the container REST server and used by any REST client, such as a data protection management engine on the proxy host or through any external interface such Postman or the Web browser. Although embodiments are described with respect to VMware open virtualization appliance (OVA) and proxies, other virtualization formats may also be used.

In an embodiment, the data mover container is provided as a single docker container image. This image contains NAS agent and filesystem agent binaries along with required utilities such as NFS and CIFS utilities, python package, message bus etc., as shown in FIG. 3. This container is deployed along with proxy host deployment and instantiation of NAS container, and no user intervention is required. That is, users need not install and maintain the container, and any required maintenance will be taken care of with proxy host re-deployment. A user can login to the container with secure channel for any troubleshooting.

In an embodiment, the multiple backup agents can be deployed on one or more proxies, where a proxy simply represents an execution place, such as a bundled VM. Backup agent generation depends on proxy deployment, which are typically pre-defined based on user proxy deployment settings. In general, many agents are not auto-deployed, but are instead deployed only when needed. In an alternative embodiment, agents can be automatically spawned based on need and other parameters.

Figure 6:
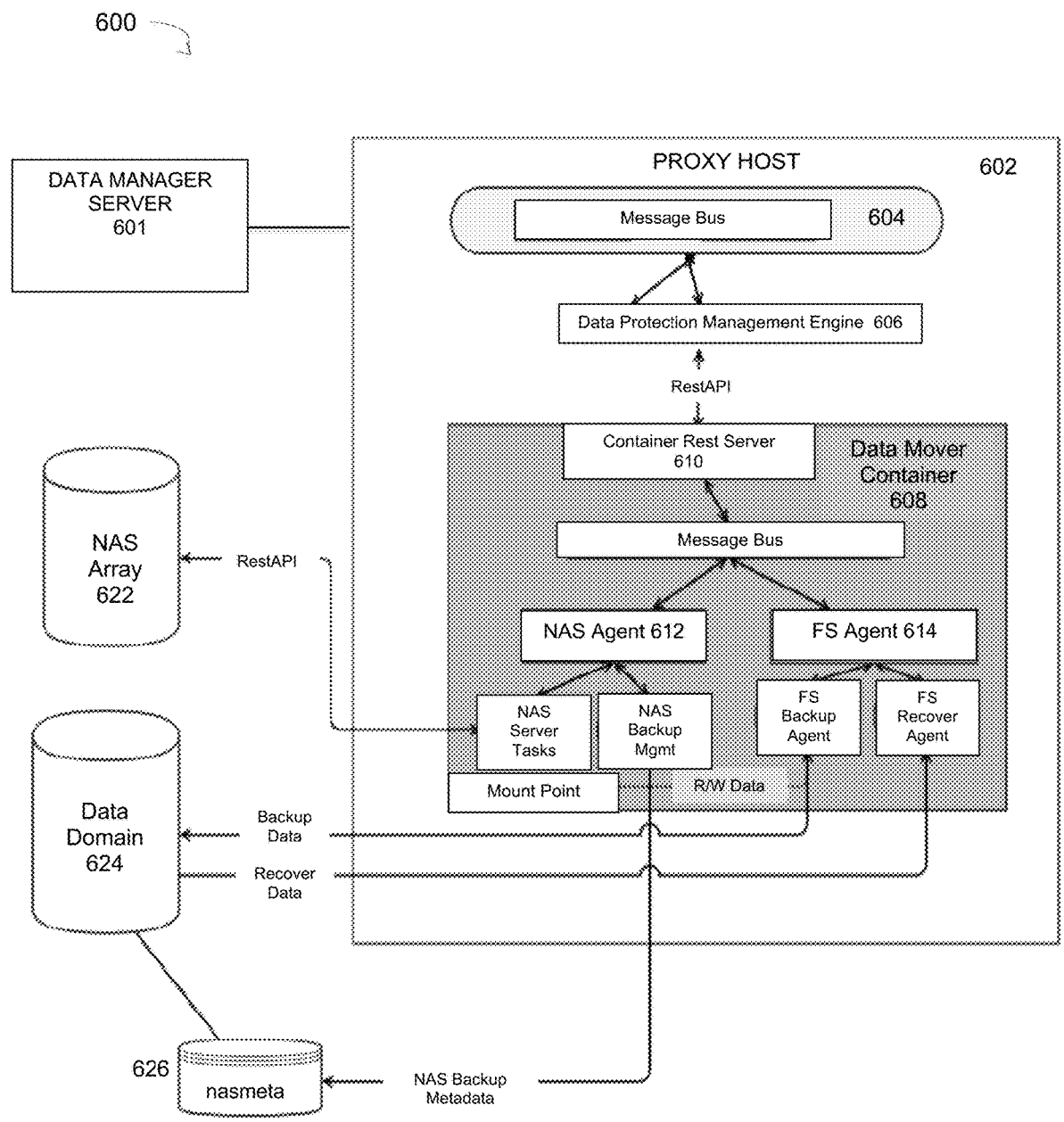
FIG. 6 illustrates the deployment of backup agents in a data mover container process of a data management system, under some embodiments.

FIG. 6 illustrates the deployment of backup agents in a data mover container process of a data management system, under some embodiments. System 800 can represent a system such as the DellEMC PowerProtect Data Manager (PPDM) system, though any other similar data protection system can be used.

When embodied as a PPDM system, system 600 provides cost-effective data protection for on-premises and in-cloud database workloads, Kubernetes containers, virtual machines and file systems. It is configured to automatically discover and protect databases, virtual machines, file systems and Kubernetes containers, and implement a common policy to automate compliance and governance across workloads.

As shown in FIG. 6, system 600 includes a data manager server 601 that comprises certain sub-components such as for NAS data management and proxy management. The data manager server 601 communicates with one or more proxy hosts 602 to create proxies and run backup sessions. It also deploys, manages, and monitors proxies. Each proxy host contains certain NAS data processing components for processing and storage of data in NAS arrays 622 and deduplication backup (PowerProtect Data Domain) storage 624.

The example proxy host 602 of FIG. 6 is shown as having a data protection management engine (DPME) 606 accessed through communication component 604 that controls data mover container 608 through a container REST server 610 and NAS agent 612. The NAS agent 612 runs backups using a NAS server task manager that interacts with the NAS array 822 to create and delete snapshot copies, and an NAS backup management component that sends NAS backup metadata to a metadata storage 626. The data mover container 608 also contains a file system agent 614 that controls a filesystem backup agent and a filesystem recover agent that communication with the PowerProtect Data Domain storage 624 during backup and recovery operations.

In an embodiment, a backup agent is installed on a proxy host and it is installed automatically with proxy host deployment. When a backup is started, the first step of the backup agent is to create a snapshot of the file system wherever a snapshot API is available. After the snapshot is taken, it is mounted on the proxy host.

In system 600, the DPME service 606 runs on the proxy host 602. This service has business logic to determine which application type container needs to be instantiated. For example, if a backup or recover request is received on the proxy host, DPME 606 identifies if that request is for NAS, SAN, filesystem, or applications (e.g., Oracle, Exchange or SQL). Based on the type of backup or recovery request, it instantiates the appropriate data mover container 608. All the communication between the DPME 606 and container 608 is through REST APIs and the container REST server 610 running inside the container 608.

The DPME 606 also keeps track of the information about how many containers are running and which container is being used for which workload. This information helps to differentiate between different type of containers and routing the incoming or outgoing request to the appropriate container. For example, the orchestrator on a PPDM server sends a request to get the status of the backup running for NAS, or the orchestrator sends a request to get the status of a recovery job running for SAN. Once the DPME receives the request, it identifies the container based on job ID and type of workload and routes it to the appropriate container on the proxy host.

The DPME 606 is also used to manage the containers. For example, if the orchestrator needs to shut down a container for any reason, such as if a user cancels a job, the DPME receives the cancel request and identifies the container based on its job ID and type of workload and routes it to the appropriate container.

The REST server 610 in the NAS container is used to communicate with external systems, such as proxy engines on proxy hosts. A new REST server 610 is built and bundled with the NAS package to be installed inside the NAS container. The container REST server 610 exposes REST APIs to initiate backup and recover sessions, get the state of a running session, grab all the log files at the end of a session, and provide a completion status of the session.

In an embodiment, the NAS agent (ppdmnasagent) 612 is packaged with the data mover container 608 to initiate backup and recovery, test and development, backup management of NAS assets, and other similar operations. The NAS agent 612 operates on certain commands for data protection and management. These include: (1) snapshot and slice; (2) backup snapshot; (3) delete snapshot; (4) get asset stats; (5) snapshot and backup; (6) generate job monitoring details; and (7) generate troubleshooting data.

The snapshot And slice command takes a snapshot copy of the NAS asset (wherever applicable) and create slices using a slicer process. A snapshot copy is a point-in-time copy of data that represents an image of a volume that can be used for data recovery of individual files or entire virtual machines or application servers. Snapshots in a storage array are managed by manipulating the metadata that is used to track the logical-physical relationship of LUNs and volumes to data on disk. When a snapshot copy is taken, the array replicates the metadata that maps the physical layout on the disk. The slicer breaks up the file system into slices (units of work) and the backup agent performs the backup work, in which a unit of work is backup data.

The backup snapshot command backs up the NAS asset slices, and the delete snapshot command deletes the snapshot (wherever applicable), and then cleans up and manages backup metadata. The get asset stats command gets the details of the NAS asset with respect to number of slice, list of slices, data size, files and folders, etc. The snapshot and backup command performs a complete cycle for a backup with pre-work, backup and post-work in single step for test and development purposes.

In an embodiment, a data mover agent for NAS PPDM filesystem agent (FSA) 614 is bundled in the data mover container 608. The NAS agent 612 will use this during backup to crawl the dataset and back up data to the target device. The NAS Agent 612 will also use this agent to recover the data on image level as well as perform file level recovery.

Although embodiments are described with respect to NAS storage, other application agents can also be provided for different storage devices and systems. Such agents include data mover agents for SAN, filesystems, Oracle databases, Microsoft SQL servers, Microsoft Exchange servers, and so on.

Although embodiments are described with respect to data storage target embodied as PowerProtect Data Domain systems, other targets could also be used, such as Cloud storage, tape libraries, and so on.

Figure 7:
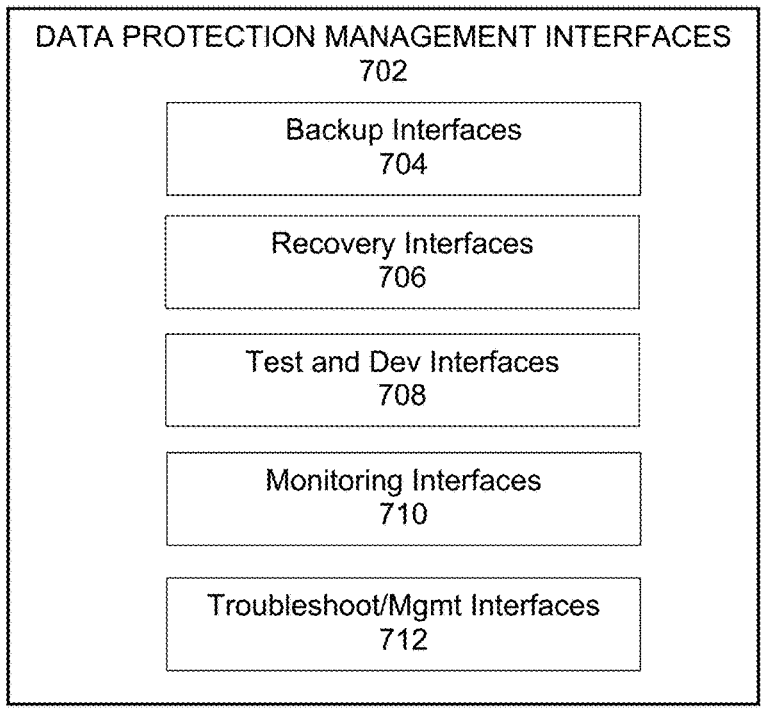
FIG. 7 illustrates some data protection management interfaces used in the data mover container system, under some embodiments.

In an embodiment, system 600 includes several data protection management interfaces. FIG. 7 illustrates some data protection management interfaces 702 used in the data mover container system, under some embodiments. Data protection is usually performed in three separate steps and each step is defined as a separate command. The same API is used for all steps with a different command. The backup interfaces 704 comprise a pre-backup stage: SNAPSHOT_AND_SLICE, a backup stage: BACKUP_SNAPSHOT, and a post-backup stage: DELETE_SNAPSHOT.

The recovery interfaces 706 comprise interfaces for share level and file level recovery: RECOVER_SHARE and RECOVER_FILE.

The test and development interfaces 708 comprise an interface to test backup in one step: SNAPSHOT_AND_BACKUP, and an interface to calculate the required compute nodes that is used for sizing the environment, dev and test: GET_SHARE_STATS.

The monitoring interfaces 710 comprise an interface to (1) retrieve the current status of the process running inside the container, and (2) retrieve the current status of the recovery process running inside the container.

The troubleshooting and management interfaces 712 comprise interfaces to (1) get the backup session logs of one type of process from the container, (2) get the logs of Recovery session, (3) cancel the process of one type which will also delete the resource from container, (3) cancel the running recovery session. These interfaces are used via REST APIs. The DPME 606 uses the REST API of the NAS container REST server and passes a JavaScript Object Notation (JSON) data object as an input. The input JSON object contains the operation type and details about the data source, data target, credentials, and so on.

Embodiments have thus been described for a portable, self-contained data mover container with all required packages for data management, and which can be hosted on a physical host, VM, cloud and appliance, such as a Storage Array. The data mover container protects multiple workloads such as NAS, native OS filesystem, applications, and so on. An automated process spins up and tears down containers without leaving any footprints on hosted environment. This provides resiliency, since, if a container fails to run on a host if desired resources are not available then it automatically runs on other hosts for same data set or moved to queue. Minimal user intervention to achieve scale and performance is required, as the system automatically computes the desired number of containers required depending upon dataset, available resources, and so on. Containers can be patched and upgraded independently on a host without making any change to the hosting environment.

Although embodiments have been described with respect to network backup comprising certain specific technologies, such as PowerProtect Data Domain backup systems, it should be noted that embodiments are not so limited, and that other backup systems and methods may also utilize the methods described herein. Furthermore, although embodiments have been described with respect to NAS storage and devices, it should be noted that any other appropriate networked storage may be used such as storage area network (SAN) or direct attached storage (DAS) devices.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 8:
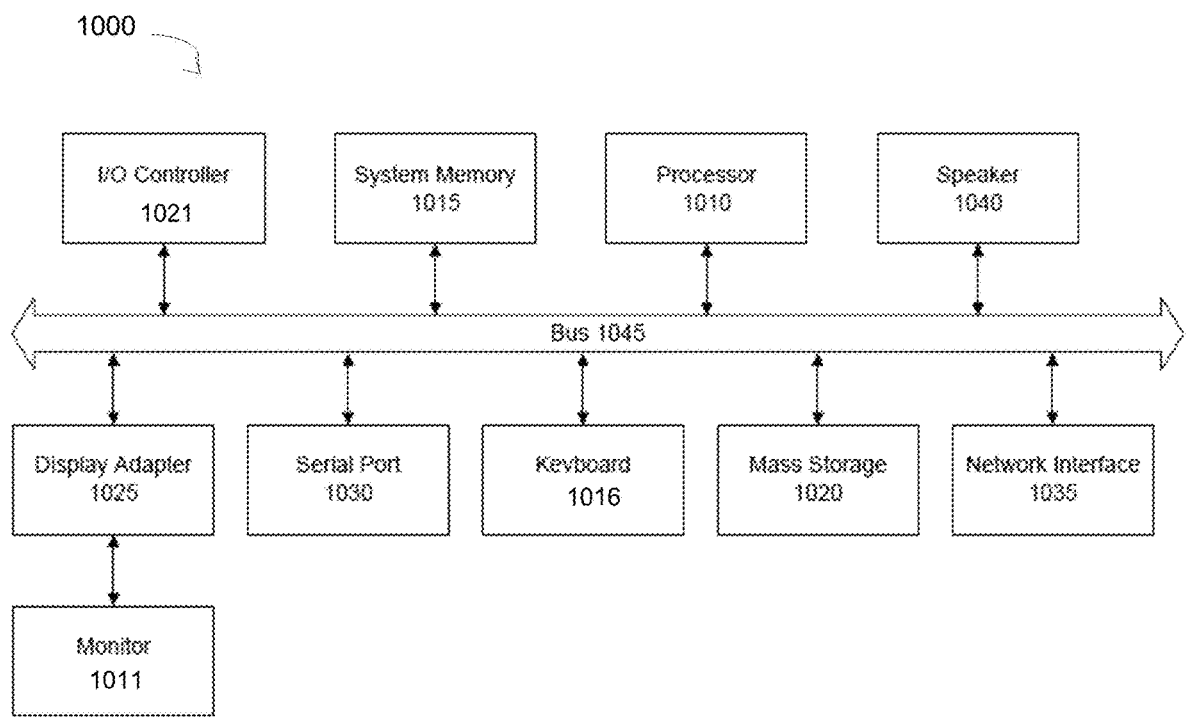
FIG. 8 is a block diagram of a computer system used to execute one or more software components of the described system, under some embodiments.

FIG. 8 is a block diagram of a computer system used to execute one or more software components of a system for a containerized data mover, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing data in a system, comprising:
   determining a number of containers required to run for a given data movement job, wherein the number of containers is calculated based on an amount of data processed in the system, a number of hosts available to run the containers, a compute size of each container, and a bandwidth of the data storage system;
   providing a data mover container having a backup agent performing data movement tasks to a data storage system for the determined number of containers;
   integrating a data storage agent, a filesystem crawler, a filesystem slicer and one or more utilities in the data mover container;
   automatically instantiating the data mover container based on workload amount and compute resource usage to perform a data movement task of the data movement tasks;
   periodically providing status updates regarding the data movement task; and
   automatically tearing down the data mover container upon completion of the data movement task.

2. The method of claim 1 wherein the data mover container is instantiated by an orchestrator component using a REST application programming interface (API).

3. The method of claim 1 wherein the data storage system is one or a network attached storage (NAS) system, a storage array network (SAN), or direct attached storage (DAS).

4. The method of claim 3 wherein the data mover container is hosted on one of a virtual machine (VM), a physical machine, a data protection appliance, a data storage appliance, or a cloud network.

5. The method of claim 1 wherein the one or more utilities comprise a network file system (NFS) or a common internet file system (CIFS) utility.

6. The method of claim 5 further comprising providing interfaces for backup operations, recovery operations, test and development tasks, monitoring tasks, and troubleshooting and management tasks.

7. The method of claim 1 wherein the system comprises a PowerProtect Data Domain deduplication backup system.

8. The method of claim 5 wherein the container comprises a Kubernetes Docker container.

9. A method of processing data in a data storage system, comprising:
   determining a number of containers required to run for a given data movement job, wherein the number of containers is calculated based on an amount of data processed in the system, a number of hosts available to run the containers, a compute size of each container, and a bandwidth of the data storage system;
   instantiating, by an orchestrator component, one or more data mover containers to run the job;
   initializing a server with services for monitoring and job handling;
   instantiating a respective storage device agent in the data mover containers to execute tasks required for the job;
   monitoring a status of each storage device agent to provide status reports to the orchestrator; and
   tearing down, by the orchestrator, each storage device agent upon completion of the job.

10. The method of claim 9 further comprising:
    determining if an instantiated data mover container fails to start;

reporting a failed data mover container to the orchestrator component; and restarting, by the orchestrator, the failed data mover container on another available host.

11. The method of claim 9 wherein the data storage system comprises a network attached storage (NAS) system, and wherein the storage device agent comprises a NAS agent.

12. The method of claim 11 wherein the NAS agent performs tasks comprising creating filesystem slices, performing backup and recovery operations, taking snapshot images of files for the backup and recovery operations, performing cleanup tasks, and obtaining dataset statistics.

13. The method of claim 11 further comprising, prior to the tearing down step:

building a response to send to the orchestrator;
collecting logs for sending to the orchestrator; and
sending a completion notice to the server.

14. The method of claim 13 wherein the data mover container comprises a Kubernetes Docker container and is instantiated by an orchestrator component using a REST application programming interface (API), and the server comprises a REST server.

15. The method of claim 9 wherein the data mover container is hosted on one of a virtual machine (VM), a physical machine, a data protection appliance, a data storage appliance, or a cloud network, and further wherein the system comprises a PowerProtect Data Domain deduplication backup system.

16. A system for processing data in a data storage system, comprising:

a processor-based component determining a number of containers required to run for a given data movement job, wherein the number of containers is calculated based on an amount of data processed in the system, a number of hosts available to run the containers, a compute size of each container, and a bandwidth of the data storage system a data mover container object provided for the number of containers as a single Kubernetes Docker container image and comprising a data storage agent, filesystem agents, one or more utilities, a proxy host image to be deployed along with a proxy host in the data storage system, and a plurality of REST application programming interfaces (APIs) for external resources; and an hardware-based orchestrator component instantiating the data mover container to run a job, initialize a server with services for monitoring and job handling, instantiating the storage device agent in the data mover container to execute tasks required for the job, and tear down the storage device agent upon completion of the job.

17. The system of claim 16 wherein the data storage system comprises a network attached storage (NAS) system, and wherein the storage device agent comprises a NAS agent, and wherein the utilities comprise a network file system (NFS) or a common internet file system (CIFS) utility.

18. The system of claim 17 wherein the REST APIs comprise interfaces for backup operations, recovery operations, test and development tasks, monitoring tasks, and troubleshooting and management tasks.

19. The system of claim 17 wherein the data storage agent and filesystem agents perform operations comprising crawling a filesystem having NAS assets, snapshotting the NAS assets, slicing filesystem files, backing up file slices, deleting snapshots, getting asset statistics, and generating job monitoring and troubleshooting data.

* * * * *